United States Patent [19]

Weissenfluh

[11] 4,090,087
[45] May 16, 1978

[54] RADIATION SHIELD FOR NUCLEAR REACTORS

[76] Inventor: John Andrew Weissenfluh, 13212 Ridge Dr., Rockville, Md. 20850

[21] Appl. No.: 721,624

[22] Filed: Sep. 8, 1976

[51] Int. Cl.² .............................................. G21F 3/02
[52] U.S. Cl. ...................................... 250/519; 176/87
[58] Field of Search ............... 250/515, 518, 519, 507; 176/87

[56] References Cited

U.S. PATENT DOCUMENTS

| | | | |
|---|---|---|---|
| 3,046,403 | 7/1962 | Montgomery | 250/507 |
| 3,633,784 | 1/1972 | Taft | 176/87 X |
| 3,812,008 | 5/1974 | Fryer | 176/87 X |
| 3,942,023 | 3/1976 | Flaugnatti | 250/519 X |
| 4,006,362 | 2/1977 | Mollon et al. | 250/518 |

*Primary Examiner*—Davis L. Willis
*Attorney, Agent, or Firm*—Edward E. Dyson; John J. Byrne

[57] ABSTRACT

A shield for use with nuclear reactor systems to attenuate radiation resulting from reactor operation. The shield comprises a container preferably of a thin, flexible or elastic material, which may be in the form of a bag, a mattress, a toroidal segment or toroid or the like filled with radiation attenuating liquid. Means are provided in the container for filling and draining the container in place. Due to its flexibility, the shield readily conforms to irregularities in surfaces with which it may be in contact in a shielding position.

14 Claims, 11 Drawing Figures

U.S. Patent    May 16, 1978    Sheet 1 of 2    4,090,087
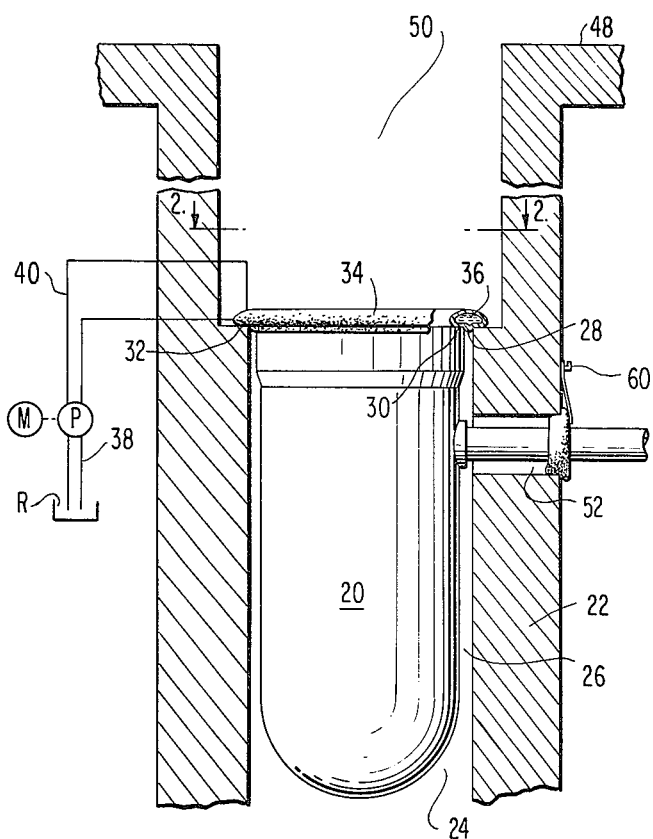
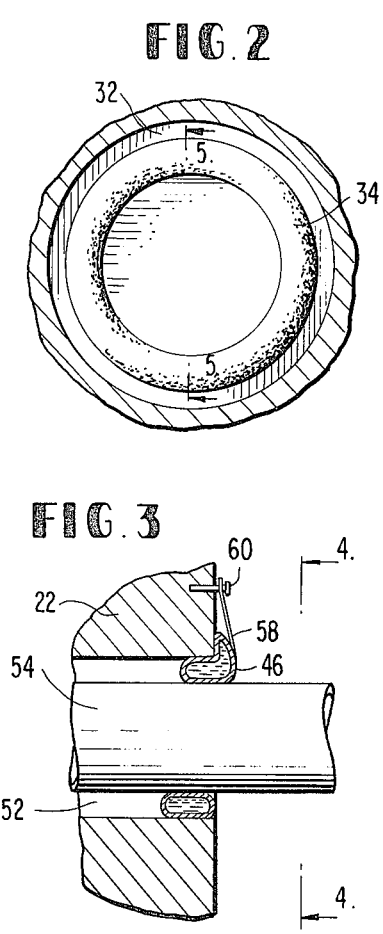
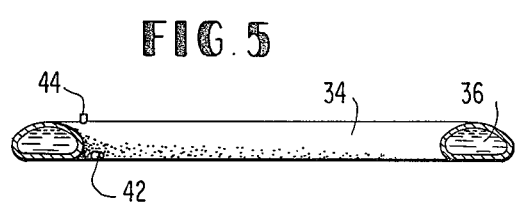
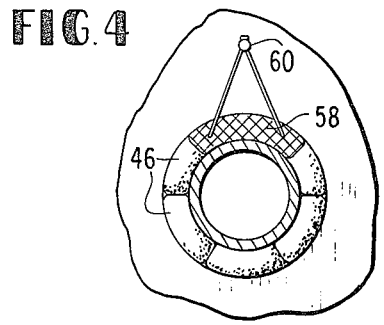
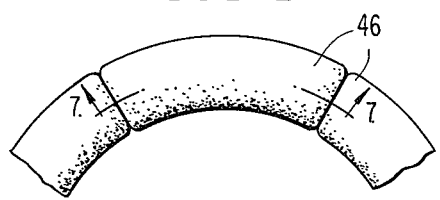
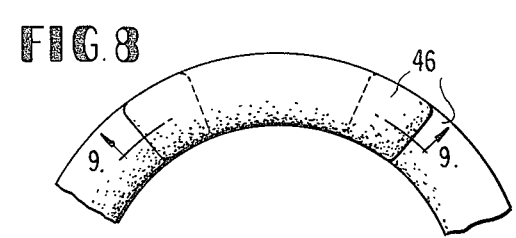

RADIATION SHIELD FOR NUCLEAR REACTORS

BACKGROUND AND FIELD OF THE INVENTION

This invention relates to an improvement in nuclear reactor operations and, more particularly, to a shield for preventing or minimizing radiation emanating from the reactor itself or fission and/or activation products resulting from reactor operation.

One of the primary uses of the shield of this invention is to attenuate the flux of neutrons from openings communicating with the reactor vessel.

Normally, a nuclear reactor assembly includes a fuel containing reactor vessel which is surrounded by a protective housing which is commonly referred to as the primary shield. The primary shield forms a right cylinder around the reactor vessel external surface and is spaced from the vessel to define a reactor cavity.

The annular space between the operating reactor vessel and the primary shield must remain open so as to relieve pressures which may result from an accidental loss of coolant. Additionally, federally required inspection necessitates open access to critical areas. Normally this results in a path of free communication between the reactor and the "operating" floor, an area occasionally occupied by technical personnel.

Duration of occupancy of the containment may be severely and unacceptably limited by the level of radiation since strict health physics rules limit the radiation dosage to be received by any individual. This limitation of stay in the containment, in turn, reduces reactor operation efficiency.

The prior art is extremely primitive. In only several operating plants, to our knowledge, has the extent of the neutron flux been recognized. Others have attempted to alleviate the neutron radiation problem by utilizing rigid hydrogenous masses in the form of plates or blocks, sometimes with a heavy metal support structure. There are several problems with those types of shields.

First of all, they are extremely heavy and difficult to install and remove, resulting in significant time expenditures. Further, such shields create storage problems when not in use. Additionally, and perhaps most importantly, those prior art shields may become missiles in the event of a pressure blowout in the reactor cavity, endangering safety-related systems within the containment.

At least one prior art patent, U.S. Pat. No. 3,812,008 to Fryer discloses the use of an inflatable seal which is described as being useful during refueling operations when the upper portion of the reactor cavity is filled with water. The seal prevents water from passing through to the lower portion of the reactor cavity. Therefore, the inflatable seal of the Fryer patent is not disclosed as being used for a radiation shield. Further, the Fryer seal as well as the aforementioned prior art shields must be more precisely manufactured to conform with the dimensions of particular openings in the reactor cavity.

While this invention is useful as a neutron shield as described above, it is also useful against other types of radiation, including beta-gamma radiation, in all areas of the nuclear reactor installation. The fluid coolant of a nuclear reactor contains radioactivity which has leaked from the fuel assemblies or results from the activation of corrosion products. This reactor coolant requires constant purging to maintain required purity.

The separation, treatment and disposal of radioactive waste products entail a number of systems generally labeled "auxiliary" or "radwaste" systems. Additionally, liquid or gaseous leaks from these fluid streams, both primary coolant and purification and radwaste must be collected, treated and disposed of as part of the radwaste system.

These radioactive systems in the nuclear reactor installation frequently require maintenance inspection or repair which necessitates personnel entry into areas of high radiation. The more concentrated sources of this radiation may be accumulated fission and corrosion products in a filter or resin bed or crud deposits in equipment, piping, or tankage. Shielding these sources is required to minimize radiation dosage to personnel. Quick and effective means of establishing emergency portable shielding permits more efficient and economic operation of the reactor installation.

Prior art devices include lead sheet and concrete block type shields which do not lend themselves readily to portability due to their weight. The container of this invention can be readily put in place and then filled with an attenuation fluid to form the shield of the invention, while the placement of heavy blocks or metal sheets is very time consuming and generally requires the use of mechanical handling and lifting apparatus. The time required to properly emplace such heavy prior art devices greatly increases personnel exposure to radiation. Since there are limitations on the amount of radiation exposure permitted to personnel over certain periods of time, the use of prior art devices may result in the radiation doses which may preclude personnel from working in the area for extended periods of time resulting in economic losses to the operator.

SUMMARY OF THE INVENTION

The aforementioned disadvantages in the prior art are overcome by the improved shield of this invention which comprises in its preferred form a thin-walled, flexible and/or elastic container in the shape of a bag, mattress, torus, toroidal segment or the like, made of any suitable plastic or elastomeric material.

In a neutron flux area such as the neighborhood of the operating reactor, the container is filled with a moderating liquid which serves as the neutron barrier. The liquid can be any hydrogenous or any other low molecular weight material and might include, in solution, boron compounds as a neutron absorber. Because of the flexibility of the containers, in whatever shape they may be, the containers will generally conform to irregularities in surfaces on the reactor vessel and/or the primary shield and/or other adjacent surfaces and may substantially overlap the surfaces to provide a more effective radiation shield.

In its use as a portable or emergency shield, against other forms of radiation in other areas of the reactor installation, the attenuating liquid can be water or any other denser liquid. In a preferred embodiment a blanket or mattress type container may be placed over the radiation source or otherwise disposed or suspended between the radiation source and the area to be protected.

The container can be readily filled and drained in place, and because of its flexibility can be folded and stored in a minimal amount of space. Moreover, in use, a fluid circulation may be employed if required for heat dissipation or other reasons.

It is an objective of this invention to provide an inexpensive and rather simplistic radiation shield for nuclear reactor installations comprising a flexible container which can be put in shielding position and then filled in place with a moderating or attenuating material.

It is a further objective of this invention to provide a radiation shield which can be readily adapted to existing nuclear reactor installations.

Still a further objective of this invention is to provide a radiation shield which is flexible and which will therefore conform to irregularities in adjacent surfaces with which it may be in contact when in shielding position.

It is a further objective of this invention to provide a shield which will adjust to the normal changes in dimensions of the operating systems.

It is a further objective of this invention to provide a shield the container of which can be readily put in place in a minimum amount of time.

It is a further objective of this invention to provide a shield which when not in use can be folded and stored in a minimum amount of space.

It is a further objective of this invention to provide a shield which due to its flexibility will adapt to various size openings, thereby obviating the need for precise and accurate manufacturing tolerances.

It is a further objective of this invention to provide a shield which is relatively safe in comparison to heavy prior art shields in the context of a pressure blowout. More particularly, in the event of a pressure blowout, the flexible bag will tend to rupture and dispell its contents while creating no danger to safety-related systems within the containment.

These and other objects of the invention will become more apparent to those skilled in the art by reference to the following detailed description when viewed in light of the accompanying drawings wherein:

BRIEF DESCRIPTION OF THE DRAWINGS

FIG. 1 is an elevational view partly in cross section of a reactor vessel and a surrounding primary shield with the radiation shield of this invention in place;

FIG. 2 is a view taken on lines 2-2 of FIG. 1;

FIG. 3 is a side view in elevation partly in cross-section of the shield of this invention in place on a conduit extending from the reactor vessel and through the side wall of the primary shield;

FIG. 4 is a view taken along the lines 4-4 of FIG. 3;

FIG. 5 is a view taken along the lines 5-5 of FIG. 2;

FIG. 6 is a plan view of a modified form of the shield of this invention;

FIG. 7 is a view taken along lines 7-7 of FIG. 6;

FIG. 8 is a plan view of an embodiment of the invention similar to that of FIG. 6 except that the segments shown therein are in overlapping relationship;

FIG. 9 is a view taken along lines 9-9 of FIG. 8;

DETAILED DESCRIPTION OF THE DRAWINGS

Figure 10:
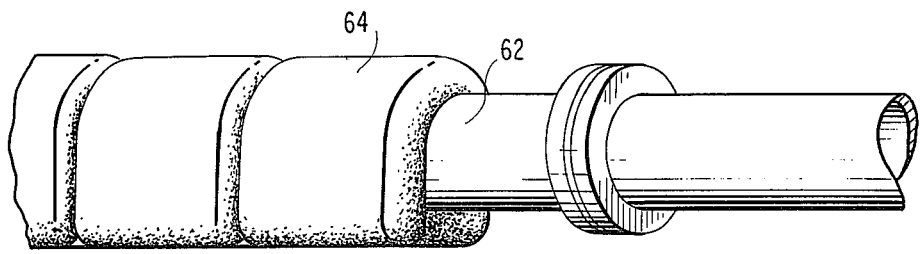
FIG. 10 is a perspective view of a further embodiment of this invention.

Referring now to the drawings wherein like numerals indicate like parts, FIG. 1 is a simplified showing of the relationship between a nuclear reactor vessel 20 and its surrounding primary shield 22. The primary shield 22 defines a reactor cavity 24. The walls of the primary shield 22 are spaced from the reactor vessel 20 to define an annular space 26 having an open upper end 28. The reactor vessel has an annular ledge 30 which is adjacent to and radially inwardly disposed from the annular ledge 32 on the primary shield.

The opening 28 between the ledges 30 and 32 is spanned by a form of the radiation shield of this invention which is generally indicated by the numeral 34. In a simplified illustration of the invention, the embodiment of FIG. 1 consists of a container made of a flexible and/or elastic plastic or elastomeric material and a hydrogenous fluid. The container is filled with the hydrogenous fluid 36 preferably including boron compounds in solution. The liquid serves as a moderator and absorber for neutron radiation emanating from the reactor vessel. Suitable inlets 42 and 44 are provided for enabling the shield 34 to be filled with or drained of the attenuation liquid. Recirculation of the fluid may be desired for heat dissipation and other reasons. In this regard, a recirculation system is employed comprising inlet and outlet lines 38 and 40, a pump P driven by motor M, and a reservoir R filled with the attenuating liquid. When not in use, the liquid can be drained from the container and the latter can be readily folded into a relatively small package for convenient storage.

As an alternative to the continuous annular shield shown in FIGS. 1, 2 and 5, a series of discrete, arcuate shaped segments or containers 46 may be employed as shown in FIGS. 6 through 9. In FIGS. 6 and 7 the separate containers are laid end to end around the opening 28 defined by the ledges 30 and 32. In FIGS. 8 and 9 the segments or containers overlap. Overlapping segments may lie in different horizontal planes to effect line-of-sight shielding of radiation as shown in exaggerated form in FIG. 9 to permit desired airflow through the labyrinth formed. Further, these segmented shields greatly facilitate handling.

In either of the embodiments, it can be readily seen that the flexible vessels effectively shield personnel on (and above) the operating floor 48 from radiation emanating from the reactor vessel 20 by closing off line-of-sight communication via the annulus 26 and the reactor well 50. Moreover, after reactor shutdown, the shield will materially reduce radiation to the reactor head area. Further, due to its flexibility, the shield will conform to any irregularities in the adjacent surfaces and further will be effective with openings of different sizes. In other words, there is no need for precise manufacturing tolerances in order to provide an effective shield.

It is also desirous to seal the opening 52 in the side wall of the primary shield 22, which opening provides a passageway for conduit 54 which leads to the reactor vessel 20. As shown more clearly in FIGS. 3 and 4, a plurality of containers 46 are fitted into the annular space 52 surrounding the conduit 54. As in the other embodiments, the containers 46 are filled with a radiation moderating liquid. FIGS. 3 and 4 also illustrate an alternative method for supporting the flexible containers. A netting 58 is suspended from a suitable hanger means 60 and contains one of the containers 46. It is to be understood that any suitable suspension means may be employed. Here also the several containers may be emplaced in different planes to permit airflow through the opening 52.

As discussed earlier in this application, the shield of this invention is not limited to use in the immediate area of the reactor vessel as a neutron moderator and absorber. The shield is useful in all areas of the nuclear reactor installation and against all forms of radiation including, beta-gamma radiation. While the shield of this invention is shown in a particular physical form (i.e., toroidal) in FIGS. 1 through 9, it is to be understood that other forms may be employed depending upon the use to which the shield is put. For example, in FIGS. 10 and 11, a mattress or blanket-like form is employed.

In FIG. 10 a potential source of radiation in the form of a conduit 62 is draped with shielding blankets 64. The blankets are flexible bags or containers filled with a radiation attenuating liquid. The bags are designed to be thrown over any structures which present a source of radiation.

Figure 11:
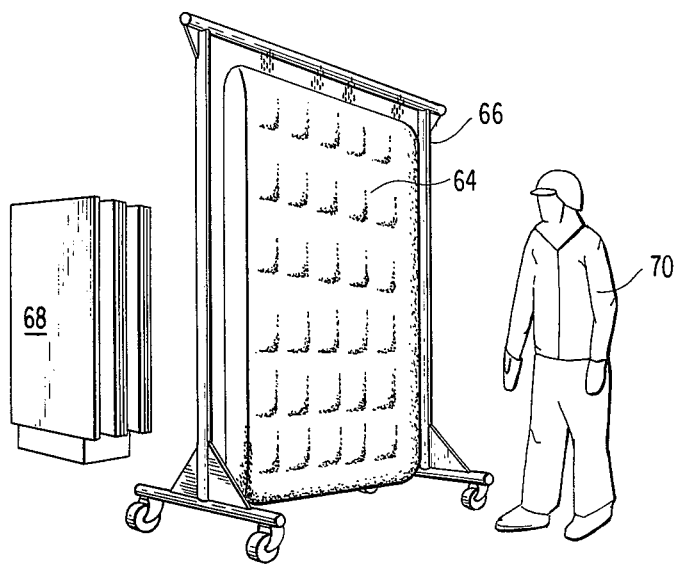
FIG. 11 is a perspective view of an embodiment similar to that of FIG. 10 shown with an illustrative support.

In FIG. 11 a bag 64 similar to those shown in FIG. 10 is suspended from a mobile carrier 66 which enables the shield to be disposed between a source of radiation 68 and a worker 70 in the area.

In operation, the containers of FIGS. 10 and 11 are connected to a source of radiation attenuating material such as by a conduit or the like. The containers are filled by actuation of a fluid flow control device from a remote point to prevent radiation exposure of attendants in the affected area.

When not in use, the bags of FIGS. 10 and 11 can be drained and folded into compact packages for storage in a minimal amount of space. When it is desired to again employ the bags in a shielding position, the bags are draped over the part to be shielded or are suspended from a carrier or the like and then are filled in place with an attenuating fluid.

It is to be understood that the flexible bag of this invention can be supported in any number of different ways without departing from the concept of the invention. Further, it is to be understood that with the bag of FIGS. 10 and 11, the fluid recirculating system such as that shown in the embodiment of FIG. 1 may be employed, if desired.

The shield of this invention constitutes a significant improvement over the prior art in that it provides a lightweight relatively inexpensive container which can quickly be put in place and which can be filled in place for effectively reducing radiation.

In a general manner, while there has been disclosed effective and efficient embodiments of the invention, it should be well understood that the invention is not limited to such embodiments as there might be changes made in the arrangement, disposition, and form of the parts without departing from the principle of the present invention as comprehended within the scope of the accompanying claims.

I claim:

1. In a nuclear reactor system comprising a reactor vessel, a biological shield surrounding said vessel and spaced therefrom, said vessel and said shield having adjacent upper surfaces defining an upper opening for the space between said vessel and said biological shield, the improvement comprising a radiation shield covering said upper opening, said radiation shield comprising a reusuable flexible container, and a liquid radiation attenuating material in said container.

2. The nuclear reactor system of claim 1 wherein said liquid radiation attenuating material contains boron compounds in solution.

3. The nuclear reactor system of claim 1 wherein said radiation shield is in the form of a toroid.

4. The nuclear reactor system of claim 1 and including means for filling and draining said reusable container.

5. The nuclear reactor of claim 1 and including means for recirculating the liquid radiation attenuating material in said container.

6. A radiation shield for use in installations containing sources of radiation, comprising a reusable flexible container, a liquid radiation attenuating material in said container, and inlet and outlet means for filling and draining said container.

7. The radiation shield of claim 6 and including retaining means for retaining said container in shielding relationship in said installations.

8. The shield of claim 6 wherein said liquid radiation attentuating material contains boron compounds in solution.

9. The shield of claim 6 wherein said container is of rectangular form.

10. The shield of claim 6 and including means for recirculating the attenuating material in said container.

11. The shield of claim 6 wherein said liquid radiation attenuating material is at least as dense as water.

12. The shield of claim 6 wherein said liquid radiation attenuation material is less dense than water.

13. A method of shielding radiation comprising the steps of emplacing a reusable flexible container in the line-of-sight between a radiation source and an area to be shielded from radiation, and filling said flexible container with a liquid material which attenuates radiation.

14. The method of claim 13 wherein the filling of said container is controlled from a location remote from said shield and away from the area affected by said radiation.

* * * * *